(12) United States Patent
Kohira et al.

(10) Patent No.: US 10,403,872 B2
(45) Date of Patent: Sep. 3, 2019

(54) CYLINDRICAL BATTERIES

(71) Applicant: SANYO ELECTRIC CO., LTD., Daito-shi, Osaka (JP)

(72) Inventors: Kazutoshi Kohira, Osaka (JP); Kyosuke Miyata, Osaka (JP); Oose Okutani, Hyogo (JP); Shuji Sugimoto, Hyogo (JP); Tomohiko Yokoyama, Osaka (JP); Shinya Geshi, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 160 days.

(21) Appl. No.: 15/559,896

(22) PCT Filed: Mar. 10, 2016

(86) PCT No.: PCT/JP2016/001340
§ 371 (c)(1),
(2) Date: Sep. 20, 2017

(87) PCT Pub. No.: WO2016/157750
PCT Pub. Date: Oct. 6, 2016

(65) Prior Publication Data
US 2018/0062124 A1   Mar. 1, 2018

(30) Foreign Application Priority Data
Mar. 27, 2015   (JP) .................. 2015-066235

(51) Int. Cl.
*H01M 2/12* (2006.01)
*H01M 2/08* (2006.01)
(Continued)

(52) U.S. Cl.
CPC ......... *H01M 2/1241* (2013.01); *H01M 2/046* (2013.01); *H01M 2/08* (2013.01);
(Continued)

(58) Field of Classification Search
None
See application file for complete search history.

(56) References Cited

U.S. PATENT DOCUMENTS

| 5,853,912 A | 12/1998 | Naing et al. |
| 6,242,126 B1 | 6/2001 | Mori et al. |
| 2015/0364734 A1 | 12/2015 | Kunoike et al. |

FOREIGN PATENT DOCUMENTS

| JP | 8-306351 A | 11/1996 |
| JP | 9-129195 A | 5/1997 |

(Continued)

OTHER PUBLICATIONS

International Search Report dated May 10, 2016, issued in Counterpart of International Application No. PCT/JP2016/001340 (2 pages).

*Primary Examiner* — Ula C Ruddock
*Assistant Examiner* — Tony S Chuo
(74) *Attorney, Agent, or Firm* — Westerman, Hattori, Daniels & Adrian, LLP

(57) ABSTRACT

A cylindrical battery having a sealing unit which includes at least a valve member, a metal plate disposed farther inside the battery than the valve member and having a joint portion connected to the valve member, and an annular insulating member disposed between an outer peripheral portion of the valve member and an outer peripheral portion of the metal plate. The metal plate has a groove-shaped thin portion disposed around the joint portion, and straight portions that have different angles to the normal to the metal plate are disposed on an inner peripheral side and an outer peripheral side of a cross section of the thin portion perpendicular to the longitudinal direction.

6 Claims, 3 Drawing Sheets

(51) Int. Cl.
*H01M 2/34* (2006.01)
*H01M 10/04* (2006.01)
*H01M 2/04* (2006.01)

(52) U.S. Cl.
CPC ....... *H01M 2/345* (2013.01); *H01M 10/0422* (2013.01); *H01M 10/0431* (2013.01); *H01M 2200/20* (2013.01)

(56) References Cited

FOREIGN PATENT DOCUMENTS

| | | |
|---|---|---|
| JP | 10-64499 A | 3/1998 |
| JP | 11-260334 A | 9/1999 |
| JP | 2004-95457 A | 3/2004 |
| JP | 2004-139809 A | 5/2004 |
| JP | 2005-38773 A | 2/2005 |
| JP | 2008-171678 A | 7/2008 |
| JP | 2008-251438 A | 10/2008 |
| JP | 2009-110808 A | 5/2009 |
| WO | 2014/119309 A1 | 8/2014 |

CYLINDRICAL BATTERIES

TECHNICAL FIELD

The present invention relates to cylindrical batteries which include a sealing unit having a current interrupt device.

BACKGROUND ART

Sealed batteries are largely classified into cylindrical batteries, prismatic batteries and pouch-type batteries depending on the shapes and materials of housing cases in which an electrode assembly that is the power generation element is accommodated. In particular, cylindrical batteries have found wide use in applications such as electric tools, power-assisted bicycles and electric vehicles. Thus, cylindrical batteries are required to exhibit high safety even when used under severe conditions.

In a cylindrical battery, a sealing unit includes safety measures such as an explosion-proof valve, a current interrupt device and a PTC (positive temperature coefficient) element. Patent Literatures 1 and 2 are example documents which disclose such sealing units. A sealing unit disclosed in Patent Literature 1 will be described below with reference to FIG. 5.

The sealing unit illustrated in FIG. 5 is composed of an aluminum case 56 in the form of a dish and, fitted therein, a stack including an external terminal cap 51, a PTC element 52, an aluminum foil 53 and an aluminum foil 55. A central portion of the aluminum foil 53 is connected to the aluminum foil 55 disposed farther inside the battery than the aluminum foil 53, and an outer peripheral portion of the aluminum foil 53 is insulated from an outer peripheral portion of the aluminum foil 55 by an insulating gasket 54. The aluminum foil 55 has a thin portion 55a. If the pressure inside the battery is raised, the thin portion 55a ruptures to interrupt the current path within the sealing unit. In this manner, the current interrupt device makes use of a rupture of part of the metal members by the action of the pressure inside the battery.

Patent Literature 2 discloses that a thin portion of an internal terminal plate that will rupture to interrupt the current is formed polygonal in cross section, and also discloses that the thin portion is curved at its tip in cross section. These configurations lead to a relaxation of the stress experienced by the thin portion when the internal terminal plate is welded to the valve member, and thus prevent the thin portion from deformation. Consequently, the variation in actuation pressure of the current interrupt devices is reduced.

CITATION LIST

Patent Literature

PTL 1: Japanese Published Unexamined Patent Application No. 8-306351
PTL 2: Japanese Published Unexamined Patent Application No. 2009-110808
PTL 3: Japanese Published Unexamined Patent Application No. 2008-251438

SUMMARY OF INVENTION

Technical Problem

Current interrupt devices have a certain range of a variation in actuation pressure. A large variation in actuation pressure causes design limitations such as the precautionary reduction of the preset actuation pressure. Further, a large variation in actuation pressure gives rise to a risk that the current interrupt device may not work stably. Thus, there has been a demand for techniques which reduce the variation in the actuation pressure of current interrupt devices.

The conventional approach to reducing the variation in the actuation pressure of current interrupt devices mainly relies on the optimization of a manner and conditions under which a weld is formed between a valve member and a metal plate or a weakened portion is formed in a metal plate. Few cylindrical batteries suited for reducing the variation in actuation pressure have been presented.

Patent Literature 3 discloses a battery which has, in part of a battery case, a groove that will rupture upon increase in the pressure inside the battery. In the cross section of the groove, the thinnest region has a certain width and curved faces with different curvature radii are disposed at both ends of the width. Patent Literature 3 describes that the variation in groove rupture pressure is reduced by designing so that the curvature radius of one of the curved faces is two or more times greater than the curvature radius of the other. The groove in Patent Literature 3 serves as a safety valve in the battery case. Because a current interrupt device needs to be actuated stably at a lower pressure than a safety valve, it is difficult to apply the shape of the groove disclosed in Patent Literature 3 to a current interrupt device.

The present invention has been made in light of the circumstances discussed above, and an object of the invention is to provide cylindrical batteries having a reduced variation in the actuation pressure of current interrupt devices.

Solution to Problem

To solve the problems discussed above, an aspect of the present invention resides in a cylindrical battery which includes an electrode assembly including a positive electrode plate and a negative electrode plate wound together via a separator, an electrolytic solution, a bottomed cylindrical housing can, and a sealing unit fixed by crimping of an open end of the housing can via a gasket, the sealing unit including a valve member, a metal plate disposed farther inside the battery than the valve member and having a joint portion connected to the valve member, and an annular insulating member disposed between an outer peripheral portion of the valve member and an outer peripheral portion of the metal plate, the metal plate having a groove-shaped thin portion disposed around the joint portion, the metal plate having a first straight portion and a second straight portion disposed on an inner peripheral side and an outer peripheral side, respectively, of a cross section of the thin portion perpendicular to the longitudinal direction, the first straight portion and the second straight portion being continuous to the surface of the metal plate, the metal plate having angles $\alpha$ and $\beta$ different from each other wherein $\alpha$ is the angle of the first straight portion relative to a normal to the metal plate and $\beta$ is the angle of the second straight portion relative to the normal to the metal plate.

Advantageous Effects of Invention

According to one aspect of the present invention, the thin portion disposed in the metal plate is allowed to rupture stably when the pressure inside the battery reaches a prescribed value. Thus, the cylindrical batteries attain a reduced variation in the actuation pressure of the current interrupt devices.

DESCRIPTION OF EMBODIMENTS

Hereinbelow, embodiments of the present invention will be described with respect to nonaqueous electrolyte secondary batteries that are an example of cylindrical batteries. The embodiments described below do not limit the scope of the invention, and the invention may be carried out while changing such embodiments appropriately without departing from the spirit of the invention.

Figure 1:
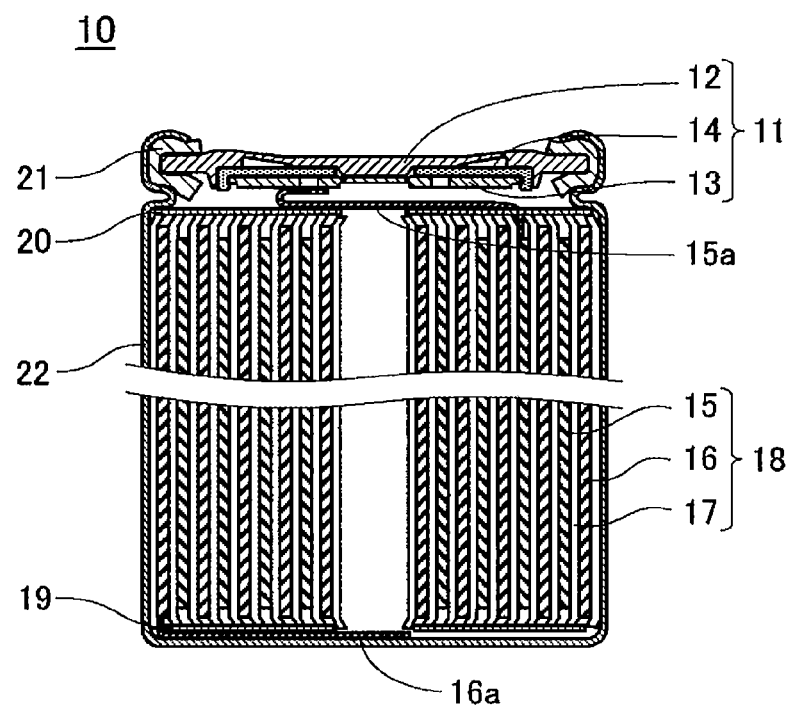
FIG. 1 is a sectional view of a cylindrical nonaqueous electrolyte secondary battery according to an embodiment of the present invention.

In a nonaqueous electrolyte secondary battery 10 illustrated in FIG. 1, an electrode assembly 18 and an electrolytic solution that is not shown are accommodated in a bottomed cylindrical housing can 22. The open end of the housing can 22 is crimped to fix a sealing unit 11 via a gasket 21, thereby sealing the inside of the battery.

Figure 2:
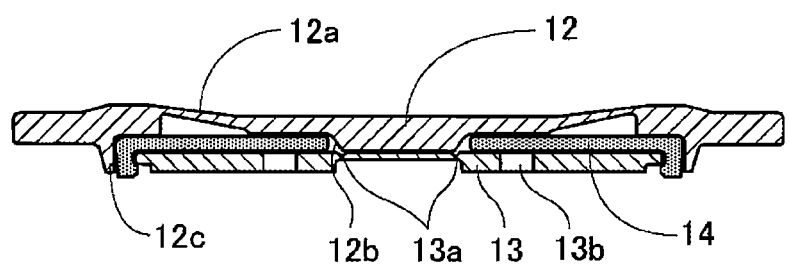
FIG. 2 is a sectional view of a sealing unit according to an embodiment of the present invention.

As illustrated in FIG. 2, the sealing unit 11 is composed of a valve member 12, a metal plate 13 and an annular insulating member 14. The valve member 12 and the metal plate 13 are connected together at their central portions, and the insulating member 14 is disposed between their outer peripheral portions. The valve member 12 disposed outermost in the sealing unit 11 serves as an external terminal, and the metal plate 13 that is connected to a positive electrode lead 15a extending from the electrode assembly 18 serves as an internal terminal. The sealing unit 11 with the above configuration advantageously attains an outstanding performance in releasing a gas from the inside of the battery in the event of a rupture of the valve member 12.

The current interrupt device is actuated in the following manner. A vent hole 13b is disposed in the metal plate 13 to allow the valve member 12 to experience a rise in the pressure inside the battery. Consequently, as the pressure inside the battery increases, the valve member 12 pulls the portion of the metal plate 13 connected thereto toward the outside of the battery. If the pressure inside the battery reaches a prescribed value, a thin portion 13a of the metal plate 13 that is a weakened portion disposed around the weld with the valve member 12 ruptures to interrupt the current path between the valve member 12 and the metal plate 13. That is, the sealing unit 11 can constitute a current interrupt device as long as it includes these three members, namely, the valve member 12, the metal plate 13 and the annular insulating member 14.

The valve member 12 may be fabricated by pressing a plate material made of aluminum or aluminum alloy. As illustrated in FIG. 2, the valve member 12 has a sloping region 12a in which the thickness decreases continuously along the radial direction from an inner peripheral portion to an outer peripheral portion, a central projection 12b, and an outer peripheral projection 12c. The sloping region 12a ensures a stable reflection of the valve member 12 by the action of the pressure inside the battery. The central projection 12b facilitates a connection to the metal plate 13 and ensures a space in which the annular insulating member 14 is disposed between outer peripheral portions of the valve member 12 and of the metal plate 13. The outer peripheral projection 12c allows the metal plate 13 to be fitted therein via the insulating member 14.

A groove-shaped thin portion may be formed in the valve member 12. In this case, the valve member 12 can serve as an explosion-proof valve stably. Such a thin portion may be formed inside the sloping region 12a. The sectional shape of the thin portion is preferably a V-shape or a U-shape.

Figure 3A:
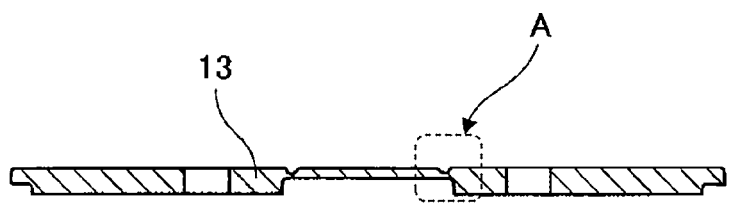
FIG. 3(a) is a sectional view of a metal plate according to an embodiment of the present invention.

The metal plate 13 may be fabricated by pressing a plate material made of aluminum or aluminum alloy. During this pressing, a groove-shaped thin portion 13a and a vent hole 13b are formed in the metal plate 13. The thin portion 13a is formed around a portion to be connected to the valve member 12. It is preferable that, as illustrated in FIG. 3(a), the thickness of a region including the thin portion 13a and surrounding portions be smaller than the thickness of the other regions.

Figure 3B:
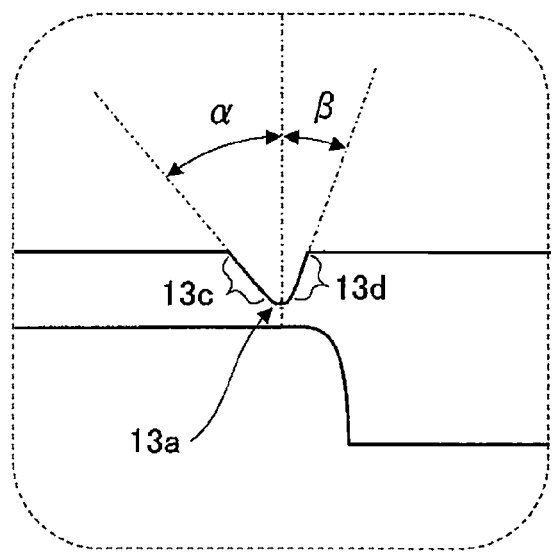
FIG. 3(b) is an enlarged view of region A illustrated in FIG. 3(a).

The planar shape of the thin portion 13a is preferably annular but may be a C-shape. In a cross section of the thin portion 13a perpendicular to the longitudinal direction, as illustrated in FIG. 3(b), a first straight portion 13c and a second straight portion 13d are disposed on an inner peripheral side and an outer peripheral side, respectively, so as to be continuous to the surface of the metal plate 13. While the cross section of the thin portion 13a may be constituted by the first straight portion 13c and the second straight portion 13d alone, a curved portion may be disposed between the first straight portion 13c and the second straight portion 13d so that the thinnest point defines the point of inflection as illustrated in FIG. 3(b).

The respective lengths of the first straight portion 13c and the second straight portion 13d are preferably each not less than 300, and more preferably each not less than 50% of the thickness of the region of the metal plate 13 in which the thin portion 13a is present.

The thin portion 13a is formed so that the first straight portion 13c and the second straight portion 13d have angles $\alpha$ and $\beta$, respectively, which are different from each other relative to the normal to the metal plate 13. This configuration reduces the variation in the pressure at which the thin portions rupture, and thus reduces the variation in the actuation pressure of the current interrupt devices. Although $\alpha$ and $\beta$ are not particularly limited, it is preferable that the difference between $\alpha$ and $\beta$ be 10° or more. While the angle of the thin portion 13a in its cross section represented by $(\alpha+\beta)$ may be determined appropriately, it is preferable that $\alpha$ and $\beta$ satisfy $10° \leq \alpha+\beta \leq 120°$.

The insulating member 14 may be any of materials which can ensure insulation between the valve member 12 and the metal plate 13 and do not affect battery characteristics. The material of the insulating member 14 is preferably a polymer resin, with examples including polypropylene (PP) resins and polybutylene terephthalate (PBT) resins.

While the present embodiment illustrates the sealing unit 11 as being composed of the valve member 12, the metal plate 13 and the insulating member 14, the sealing unit may include additional members. Examples of such additional members include a terminal cap and a PTC element. The terminal cap is disposed farther outside the battery than the valve member 12 and serves as an external terminal in place of the valve member 12. While in the present embodiment the metal plate 13 serves as a terminal plate, an additional metal plate may be disposed farther inside the battery than the metal plate 13 to serve as a terminal plate.

Next, the electrode assembly 18 will be described. In the present embodiment, as illustrated in FIG. 1, the electrode assembly 18 is one fabricated by winding a positive electrode plate 15 and a negative electrode plate 16 via a separator 17.

For example, the positive electrode plate 15 may be fabricated as follows. First, a positive electrode active material and a binder are kneaded to uniformity in a dispersion medium to give a positive electrode mixture slurry. The binder is preferably polyvinylidene fluoride, and the dispersion medium is preferably N-methylpyrrolidone. A conductive agent such as graphite or carbon black is preferably added to the positive electrode mixture slurry. The positive electrode mixture slurry is applied onto a positive electrode current collector, and the wet film is dried to form a positive electrode mixture layer. During this process, part of the positive electrode current collector is left exposed from the positive electrode mixture layer. The positive electrode mixture layer is then compressed to a prescribed thickness with a roller, and the compressed electrode plate is cut to a prescribed size. Lastly, a positive electrode lead 15a is connected to the exposed portion of the positive electrode current collector.

The positive electrode active material may be a lithium transition metal composite oxide capable of storing and releasing lithium ions. Examples of the lithium transition metal composite oxides include those of the general formulas $LiMO_2$ (M is at least one of Co, Ni and Mn), $LiMn_2O_4$ and $LiFePO_4$. These materials may be used singly, or two or more may be used as a mixture. The material may contain at least one selected from the group consisting of Al, Ti, Mg and Zr, in addition to or in place of the transition metal element.

For example, the negative electrode plate 16 may be fabricated as follows. First, a negative electrode active material and a binder are kneaded to uniformity in a dispersion medium to give a negative electrode mixture slurry. The binder is preferably styrene butadiene (SBR) copolymer or polyvinylidene fluoride (PVdF), and the dispersion medium is preferably water. A thickening agent such as carboxymethylcellulose is preferably added to the negative electrode mixture slurry. The negative electrode mixture slurry is applied onto a negative electrode current collector, and the wet film is dried to form a negative electrode mixture layer. During this process, part of the negative electrode current collector is left exposed from the negative electrode mixture layer. The negative electrode mixture layer is then compressed to a prescribed thickness with a roller, and the compressed electrode plate is cut to a prescribed size. Lastly, a negative electrode lead 16a is connected to the exposed portion of the negative electrode current collector.

The negative electrode active material may be a carbon material or a metal material which each can store and release lithium ions. Examples of the carbon materials include graphites such as natural graphite and artificial graphite. Examples of the metal materials include silicon, tin and oxides of these metals. The carbon materials and the metal materials may be used singly, or two or more may be used as a mixture.

The separator 17 may be a macroporous film based on a polyolefin such as polyethylene (PE) or polypropylene (PP). A single macroporous film, or a stack of two or more such films may be used. In the case where the separator is a stack including two or more layers, it is preferable that a layer based on polyethylene (PE) having a low melting point be an intermediate layer, and polypropylene (PP) having excellent oxidation resistance be a surface layer. Further, inorganic particles such as aluminum oxide ($Al_2O_3$), titanium oxide ($TiO_2$) or silicon oxide ($SiO_2$) may be added to the separator. Such inorganic particles may be suspended within the separator or may be applied together with a binder onto the separator surface.

The nonaqueous electrolytic solution may be a solution of a lithium salt as an electrolyte salt in a nonaqueous solvent.

Some nonaqueous solvents that can be used are cyclic carbonate esters, chain carbonate esters, cyclic carboxylate esters and chain carboxylate esters. Preferably, two or more of these solvents are used as a mixture. Examples of the cyclic carbonate esters include ethylene carbonate (EC), propylene carbonate (PC) and butylene carbonate (BC). The cyclic carbonate esters may be substituted with fluorine in place of part of the hydrogen atoms, with examples including fluoroethylene carbonate (FEC). Examples of the chain carbonate esters include dimethyl carbonate (DMC), ethyl methyl carbonate (EMC), diethyl carbonate (DEC) and methyl propyl carbonate (MPC). Examples of the cyclic carboxylate esters include γ-butyrolactone (γ-BL) and γ-valerolactone (γ-VL). Examples of the chain carboxylate esters include methyl pivalate, ethyl pivalate, methyl isobutyrate and methyl propionate.

Examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Of these, $LiPF_6$ is particularly preferable. The concentration in the nonaqueous electrolytic solution is preferably 0.5 to 2.0 mol/L. $LiPF_6$ may be mixed with other lithium salt such as $LiBF_4$.

EXAMPLES

The cylindrical batteries discussed as an embodiment of the present invention will be described in detail based on specific examples below.

Example 1

(Fabrication of Sealing Unit)

A valve member 12 and a metal plate 13 were fabricated by pressing aluminum plate materials. While an annular insulating member 14 was arranged between outer peripheral portions of the valve member 12 and of the metal plate 13, the valve member 12 and the metal plate 13 were connected at their central portions. During the pressing of the metal plate 13, an annular thin portion 13a had been formed around a portion to be connected to the valve member 12. The angle α of a first straight portion 13c relative to the normal to the metal plate 13 was 60°, and the angle β of a second straight portion 13d relative to the normal to the metal plate 13 was 30°. A sealing unit 11 was thus fabricated.

(Fabrication of Positive Electrode Plate)

To a dispersion medium were added 100 parts by mass of $LiNi_{0.8}Co_{0.15}Al_{0.05}O_2$ as a positive electrode active material, 1.7 parts by mass of polyvinylidene fluoride (PVdF) as a binder and 2.5 parts by weight of acetylene black as a conductive agent. The mixture was kneaded to give a positive electrode mixture slurry. The positive electrode mixture slurry was applied onto both sides of a positive electrode current collector composed of aluminum foil, and was dried to form positive electrode mixture layers. During this process, part of the positive electrode current collector was left exposed from the positive electrode mixture layers. The positive electrode mixture layers were then compressed to a prescribed thickness with a roller, and the compressed electrode plate was cut to a prescribed size. Lastly, a positive electrode lead 15a made of aluminum was connected to the exposed portion of the positive electrode current collector by ultrasonic welding. A positive electrode plate 15 was thus fabricated.

(Fabrication of Negative Electrode Plate)

To a dispersion medium were added 100 parts by mass of graphite as a negative electrode active material, 0.6 parts by mass of polyvinylidene fluoride (PVdF) as a binder and 1 part by weight of carboxymethylcellulose (CMC) as a thickening agent. The mixture was kneaded to give a negative electrode mixture slurry. The negative electrode mixture slurry was applied onto both sides of a negative electrode current collector composed of copper foil, and was dried to form negative electrode mixture layers. During this process, part of the negative electrode current collector was left exposed from the negative electrode mixture layers. The negative electrode mixture layers were then compressed to a prescribed thickness with a roller, and the compressed electrode plate was cut to a prescribed size. Lastly, a negative electrode lead 16a made of nickel was connected to the exposed portion of the negative electrode current collector by ultrasonic welding. A negative electrode plate 16 was thus fabricated.

(Preparation of Nonaqueous Electrolytic Solution)

A nonaqueous solvent was prepared by mixing ethylene carbonate (EC), dimethyl carbonate (DMC) and ethyl methyl carbonate (EMC). Lithium hexafluorophosphate ($LiPF_6$) as an electrolyte salt was dissolved into the nonaqueous solvent so that its concentration would be 1 mol/L. A nonaqueous electrolytic solution was thus prepared.

(Fabrication of Electrode Assembly)

The positive electrode plate 15 and the negative electrode plate 16 fabricated above were wound together via a separator 17 composed of a microporous polyolefin film, thus forming an electrode assembly 18.

(Fabrication of Nonaqueous Electrolyte Secondary Battery)

As illustrated in FIG. 1, a lower insulating plate 19 was placed under the electrode assembly 18, and the electrode assembly 18 was inserted into a bottomed cylindrical housing can 22. The negative electrode lead 16a was connected to the bottom of the housing can 22 by resistance welding. Next, an upper insulating plate 20 was placed on top of the electrode assembly 18, and a portion of the housing can 22 near the open end was plastically deformed to form a U-shaped groove 1.0 mm in width and 1.5 mm in depth in the circumferential direction. The positive electrode lead 15a was connected to the metal plate 13 by laser welding, and the sealing unit 11 was fitted into the groove of the housing can 22 via a gasket 21. A nonaqueous electrolyte secondary battery 10 was thus fabricated.

Examples 2 to 5

Nonaqueous electrolyte secondary batteries of EXAMPLES 2 to 5 were fabricated in the same manner as in EXAMPLE 1, except that the angle α of the first straight portion 13c relative to the normal to the metal plate 13, and the angle β of the second straight portion 13d relative to the normal to the metal plate 13 were changed to values described in Table 1.

Comparative Example

A nonaqueous electrolyte secondary battery of COMPARATIVE EXAMPLE was fabricated in the same manner as in EXAMPLE 1, except that the angle α of the first straight portion 13c relative to the normal to the metal plate 13, and the angle β of the second straight portion 13d relative to the normal to the metal plate 13 were both 45°.

(Measurement of Actuation Pressure)

Ten batteries fabricated in each of EXAMPLES 1 to 5 and COMPARATIVE EXAMPLE were provided and were charged to a state of charge of 30%. The sealing units were removed from the charged batteries and were tested to measure the actuation pressure of the current interrupt device in the sealing unit. The measurement of actuation pressure was performed as follows.

Figure 4:
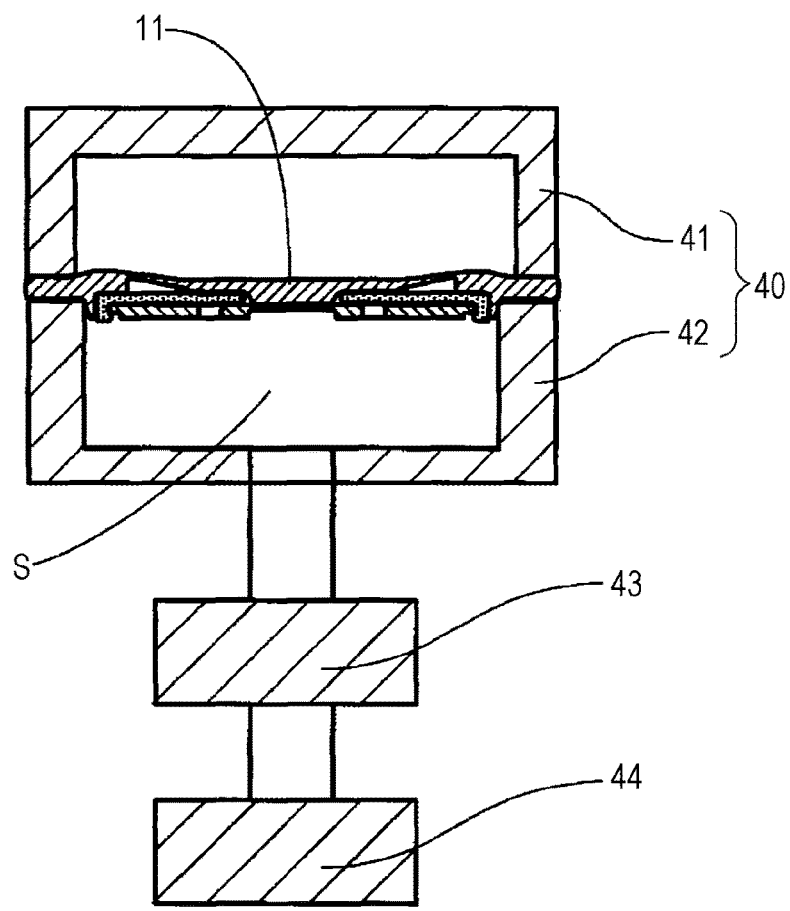
FIG. 4 is a schematic view illustrating an apparatus used for the measurement of actuation pressure.
Figure 5:
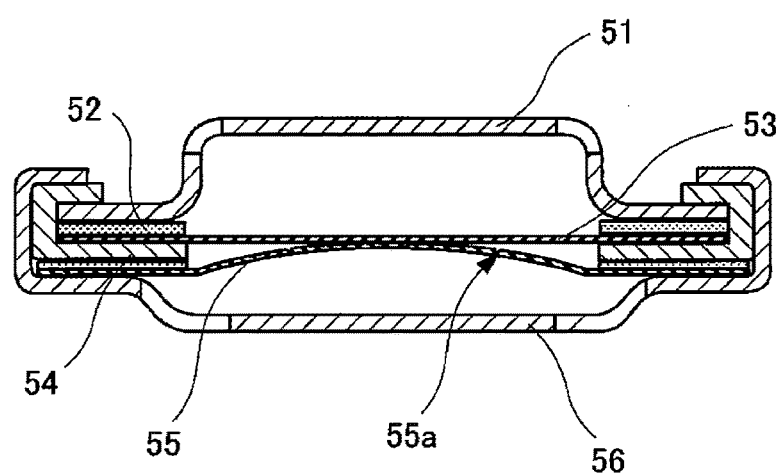
FIG. 5 is a sectional view of a conventional example sealing unit.

As illustrated in FIG. 4, the sealing unit was fixed to a fixing jig 40 having a pressing section 41 and a supporting section 42. The supporting section 42 was fixed to part of the measurement apparatus, and a pressing force was applied from above the pressing section 41 using an air cylinder so as to ensure the airtightness in the space S enclosed by the sealing unit and the supporting section 42. Nitrogen gas was supplied to the space S at a constant rate from a nitrogen gas tank 44 via a regulator 43.

During the supply of nitrogen gas, the pressure in the space S and the continuity of the current path between the valve member and the metal plate were checked in real time. The continuity of the current path was examined by connecting a pair of electrode terminals connected to a galvanometer to the pressing section 41 of the fixing jig 40 and the metal plate. The pressing section 41 was composed of a metal and was thus electrically connected to the valve member.

The pressure in the space S at which the current path between the valve member and the metal plate was interrupted during the supply of nitrogen gas was obtained as the actuation pressure of the current interrupt device of the sealing unit. From the actuation pressures measured in this manner, the standard deviation (σ) was calculated in each of EXAMPLES 1 to 5 and COMPARATIVE EXAMPLE. The standard deviation was used as a measure of the variation in actuation pressure. The results are described in Table 1.

TABLE 1

| | Angle α | Angle β | |α − β| | Variation in actuation pressure |
|---|---|---|---|---|
| EX. 1 | 60° | 30° | 30° | 0.7 kgf/cm$^2$ |
| EX. 2 | 55° | 35° | 20° | 0.8 kgf/cm$^2$ |
| EX. 3 | 50° | 40° | 10° | 0.9 kgf/cm$^2$ |
| EX. 4 | 30° | 60° | 30° | 0.7 kgf/cm$^2$ |
| EX. 5 | 30° | 10° | 20° | 0.7 kgf/cm$^2$ |
| COMP. EX. 1 | 45° | 45° | 0° | 1.8 kgf/cm$^2$ |

From Table 1, EXAMPLES 1 to 5 in which α and β were different from each other attained a significant decrease in the variation in actuation pressure as compared to the variation in actuation pressure in COMPARATIVE EXAMPLE. In contrast to a variation in actuation pressure of 1.8 kgf/cm$^2$ in COMPARATIVE EXAMPLE, the variation in actuation pressure in EXAMPLE 3 in which the difference between α and β was 10° was as small as 0.9 kgf/cm$^2$. This result shows that the advantageous effects of the present invention are obtained by making the values of α and β different from each other. The difference between α and β is therefore not particularly limited. Because, however, the change in the variation in actuation pressure is small when the difference between α and β is 10° and more, it is preferable that α and β satisfy $10° \leq |α-β|$.

The comparison of EXAMPLES 1 and 4 shows that similar results are obtained even when the values of α and β are exchanged. That is, the advantageous effects of the invention are attained regardless of which of α and β is larger.

In EXAMPLES 2 and 5, the differences between α and β are the same but the combinations of the values of α and β are different. In spite of this fact, the variations in actuation pressure obtained in EXAMPLES 2 and 5 are substantially the same. That is, the advantageous effects of the present invention have a low dependence on the angle of the thin portion represented by (α+β). It is therefore not necessary to set a particular limitation on the angle of the thin portion. From the points of view of the feasible range of actuation pressure and the easiness in production, it is preferable that α and β satisfy $10°\leq\alpha+\beta\leq120°$.

While the embodiments of the present invention discussed above have illustrated nonaqueous electrolyte secondary batteries, the invention can be applied also to cylindrical batteries other than nonaqueous electrolyte secondary batteries, for example, to nickel hydrogen batteries.

INDUSTRIAL APPLICABILITY

As described hereinabove, the present invention can reduce the variation in the actuation pressure of current interrupt devices and thus can provide cylindrical batteries having excellent safety. In particular, the present invention is suited for applications in which cylindrical batteries with high energy density are used. Examples of such applications include power supplies for driving of, for example, compact electronic devices such as laptops, power tools such as electric tools and power-assisted bicycles, and electric vehicles.

REFERENCE SIGNS LIST

10 NONAQUEOUS ELECTROLYTE SECONDARY BATTERY
11 SEALING UNIT
12 VALVE MEMBER
12a SLOPING REGION
12b CENTRAL PROJECTION
12c OUTER PERIPHERAL PROJECTION
13 METAL PLATE
13a THIN PORTION
13b VENT HOLE
13c FIRST STRAIGHT PORTION
13d SECOND STRAIGHT PORTION
14 INSULATING MEMBER
15 POSITIVE ELECTRODE PLATE
16 NEGATIVE ELECTRODE PLATE
17 SEPARATOR
18 ELECTRODE ASSEMBLY
22 HOUSING CAN

The invention claimed is:

1. A cylindrical battery comprising an electrode assembly including a positive electrode plate and a negative electrode plate wound together via a separator, an electrolytic solution, a bottomed cylindrical housing can, and a sealing unit fixed by crimping of an open end of the housing can via a gasket, the sealing unit including at least a valve member, a metal plate disposed farther inside the battery than the valve member and having a joint portion connected to the valve member, and an annular insulating member disposed between an outer peripheral portion of the valve member and an outer peripheral portion of the metal plate, the metal plate having a groove-shaped thin portion disposed around the joint portion, the metal plate having a first straight portion and a second straight portion disposed on an inner peripheral side and an outer peripheral side, respectively, of a cross section of the thin portion perpendicular to the longitudinal direction, the first straight portion and the second straight portion being continuous to the surface of the metal plate, the metal plate having angles α and β different from each other wherein α is the angle of the first straight portion relative to a normal to the metal plate and β is the angle of the second straight portion relative to the normal.

2. The cylindrical battery according to claim 1, wherein α and β satisfy $10°\leq|\alpha-\beta|$ and $10°\leq\alpha+\beta\leq120°$.

3. The cylindrical battery according to claim 1, wherein the thinnest part of the thin portion is the point of inflection of a curve interposed between the first straight portion and the second straight portion.

4. The cylindrical battery according to claim 1, wherein the thinnest part of the thin portion is the point of intersection of the first straight portion and the second straight portion.

5. The cylindrical battery according to claim 1, wherein the planar shape of the thin portion is annular.

6. The cylindrical battery according to claim 1, wherein the valve member is disposed outermost in the sealing unit.

* * * * *